(12) United States Patent
Ben Dayan et al.

(10) Patent No.: US 12,038,871 B2
(45) Date of Patent: *Jul. 16, 2024

(54) DATA MIGRATION IN A DISTRIBUTIVE FILE SYSTEM

(71) Applicant: Weka.IO Ltd, Tel Aviv (IL)

(72) Inventors: Maor Ben Dayan, Tel Aviv (IL); Omri Palmon, Tel Aviv (IL); Liran Zvibel, Tel Aviv (IL); Kanael Arditti, Tel Aviv (IL)

(73) Assignee: Weka.IO Ltd. (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/314,879

(22) Filed: May 10, 2023

(65) Prior Publication Data

US 2023/0273899 A1 Aug. 31, 2023

Related U.S. Application Data

(63) Continuation of application No. 17/496,924, filed on Oct. 8, 2021, now Pat. No. 11,693,818, which is a
(Continued)

(51) Int. Cl.
*G06F 16/11* (2019.01)
*G06F 11/10* (2006.01)
(Continued)

(52) U.S. Cl.
CPC ........ *G06F 16/119* (2019.01); *G06F 11/1076* (2013.01); *G06F 16/13* (2019.01); *G06F 16/182* (2019.01); *G06F 2211/1028* (2013.01)

(58) Field of Classification Search
None
See application file for complete search history.

(56) References Cited

U.S. PATENT DOCUMENTS 6,487,636 B1  11/2002  Dolphin et al.
6,748,488 B2 *  6/2004  Byrd ................... G06F 11/1076
                                          714/E11.034
(Continued)

FOREIGN PATENT DOCUMENTS

CN   101154174 A   4/2008
CN   103458023 A   12/2013
CN   107924351 A   4/2018

OTHER PUBLICATIONS

Ho, Chien-Chung, et al. "Antiwear leveling design for SSDs with hybrid ECC capability." IEEE Transactions on Very Large Scale Integration (VLSI) Systems 25.2 (2016): 488-501. (Year: 2016).*
(Continued)

*Primary Examiner* — Uyen T Le
(74) *Attorney, Agent, or Firm* — McAndrews, Held & Malloy, Ltd.

(57) ABSTRACT

A plurality of computing devices are communicatively coupled to each other via a network, and each of the plurality of computing devices is operably coupled to one or more of a plurality of storage devices. A plurality of failure resilient address spaces are distributed across the plurality of storage devices such that each of the plurality of failure resilient address spaces spans a plurality of the storage devices. The plurality of computing devices maintains metadata that maps each failure resilient address space to one of the plurality of computing devices. The metadata is grouped into buckets. Each bucket is stored in the backend of a computing device. Data may be migrated from an external file system to the plurality of storage devices using inode stubs to represent directories and files of the external file system. As the contents of the external file system are copied, the inode stubs are replaced with real inodes.

20 Claims, 7 Drawing Sheets

Related U.S. Application Data continuation of application No. 16/273,762, filed on Feb. 12, 2019, now Pat. No. 11,169,961.

(60) Provisional application No. 62/691,732, filed on Jun. 29, 2018.

(51) Int. Cl.
*G06F 16/13* (2019.01)
*G06F 16/182* (2019.01)

(56) References Cited

U.S. PATENT DOCUMENTS

| | | |
|---|---|---|
| 7,447,839 B2 | 11/2008 | Uppala |
| 7,681,072 B1 | 3/2010 | Gibson et al. |
| 7,793,146 B1 | 9/2010 | Gibson et al. |
| 7,831,643 B1 | 11/2010 | Beloussov et al. |
| 7,856,528 B1 * | 12/2010 | Frost .................. G06F 3/0644 711/170 |
| 7,870,356 B1 | 1/2011 | Veeraswamy et al. |
| 8,417,987 B1 | 4/2013 | Goel et al. |
| 8,645,749 B2 | 2/2014 | Reche |
| 8,918,478 B2 | 12/2014 | Ozzie et al. |
| 9,087,012 B1 | 7/2015 | Hayes et al. |
| 9,448,887 B1 | 9/2016 | Ben Dayan et al. |
| 11,169,961 B2 | 11/2021 | Ben Dayan et al. |
| 2010/0199125 A1 | 8/2010 | Reche |
| 2011/0078496 A1 * | 3/2011 | Jeddeloh ................. G06F 3/064 714/E11.062 |
| 2015/0355971 A1 | 12/2015 | Becker-Szendy et al. |
| 2016/0246677 A1 | 8/2016 | Sangamkar et al. |

OTHER PUBLICATIONS

Ji, Minwen, Edward W. Felten, Randolph Wang, and Jaswinder P. Singh. "Archipelago: An island-based file system for highly available and scalable internet services." In Proceedings of 4th USENIX Windows Systems Symposium. 2000. 12 pages. (Year: 2000).*
Int'l Search Report and Written Opinion Appln No. PCT/IB2016/001177 mailed Dec. 2, 2016.
Int'l Search Report and Written Opinion Appln No. PCT/IB2019/000736 mailed May 18, 2020.
Int'l Preliminary Report on Patentability Appln No. PCT/IB2019/000736 mailed Jan. 7, 2021.
Chinese Office Action Appln No. 201980056627X dated Dec. 1, 2023.

* cited by examiner

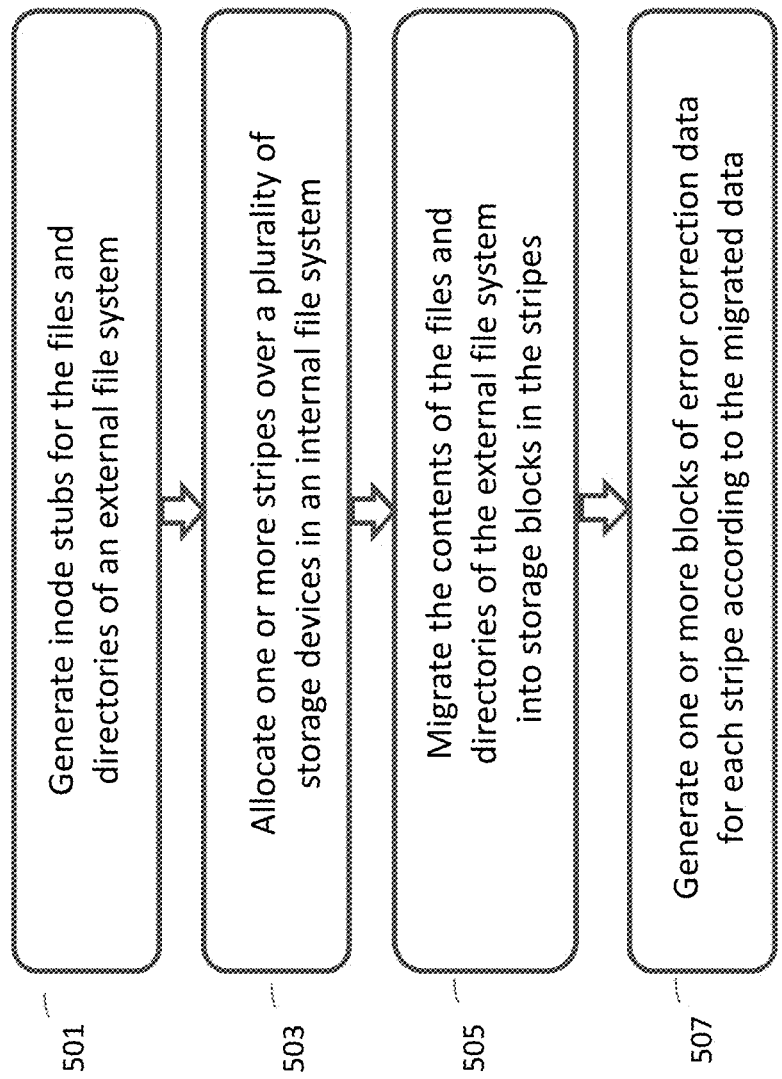

DATA MIGRATION IN A DISTRIBUTIVE FILE SYSTEM

PRIORITY CLAIM

This application which is a continuation of U.S. patent application Ser. No. 17/496,924 filed Oct. 8, 2021, which is a continuation of U.S. patent application Ser. No. 16/273,762, filed Feb. 12, 2019 (U.S. Pat. No. 11,169,961), which claims priority to U.S. provisional patent application 62/691,732, filed on Jun. 29, 2018. The aforementioned applications are each hereby incorporated herein by reference in their entirety.

BACKGROUND

Limitations and disadvantages of conventional approaches to data storage will become apparent to one of skill in the art, through comparison of such approaches with some aspects of the present method and system set forth in the remainder of this disclosure with reference to the drawings.

INCORPORATION BY REFERENCE

U.S. patent application Ser. No. 15/243,519 titled "Distributed Erasure Coded Virtual File System" is hereby incorporated herein by reference in its entirety.

BRIEF SUMMARY

Methods and systems are provided for data migration in a distributed file system substantially as illustrated by and/or described in connection with at least one of the figures, as set forth more completely in the claims.

BRIEF DESCRIPTION OF THE DRAWINGS

FIG. 5 is a flowchart illustrating an example method for data migration to a distributed file system in accordance with this disclosure.

DETAILED DESCRIPTION

Traditionally, file systems use a centralized control over the metadata structure (e.g., directories, files, attributes, file contents). If a local file system is accessible from a single server and that server fails, the file system's data may be lost if as there is no further protection. To add protection, some file systems (e.g., as provided by NetApp) have used one or more pairs of controllers in an active-passive manner to replicate the metadata across two or more computers. Other solutions have used multiple metadata servers in a clustered way (e.g., as provided by IBM GPFS, Dell EMC Isilon, Lustre, etc.). However, because the number of metadata servers in a traditional clustered system is limited to small numbers, such systems are unable to scale.

The systems in this disclosure are applicable to small clusters and can also scale to many, many thousands of nodes. An example embodiment is discussed regarding non-volatile memory (NVM), for example, flash memory that comes in the form of a solid-state drive (SSD). The NVM may be divided into 4 kB blocks and 128 MB chunks. Extents may be stored in volatile memory, e.g., RAM for fast access, backed up by NVM storage as well. An extent may store pointers for blocks, e.g., 256 pointers to 1 MB of data stored in blocks. In other embodiments, larger or smaller memory divisions may also be used. Metadata functionality in this disclosure may be effectively spread across many servers. For example, in cases of "hot spots" where a large load is targeted at a specific portion of the file system's namespace, this load can be distributed across a plurality of nodes.

Figure 1:
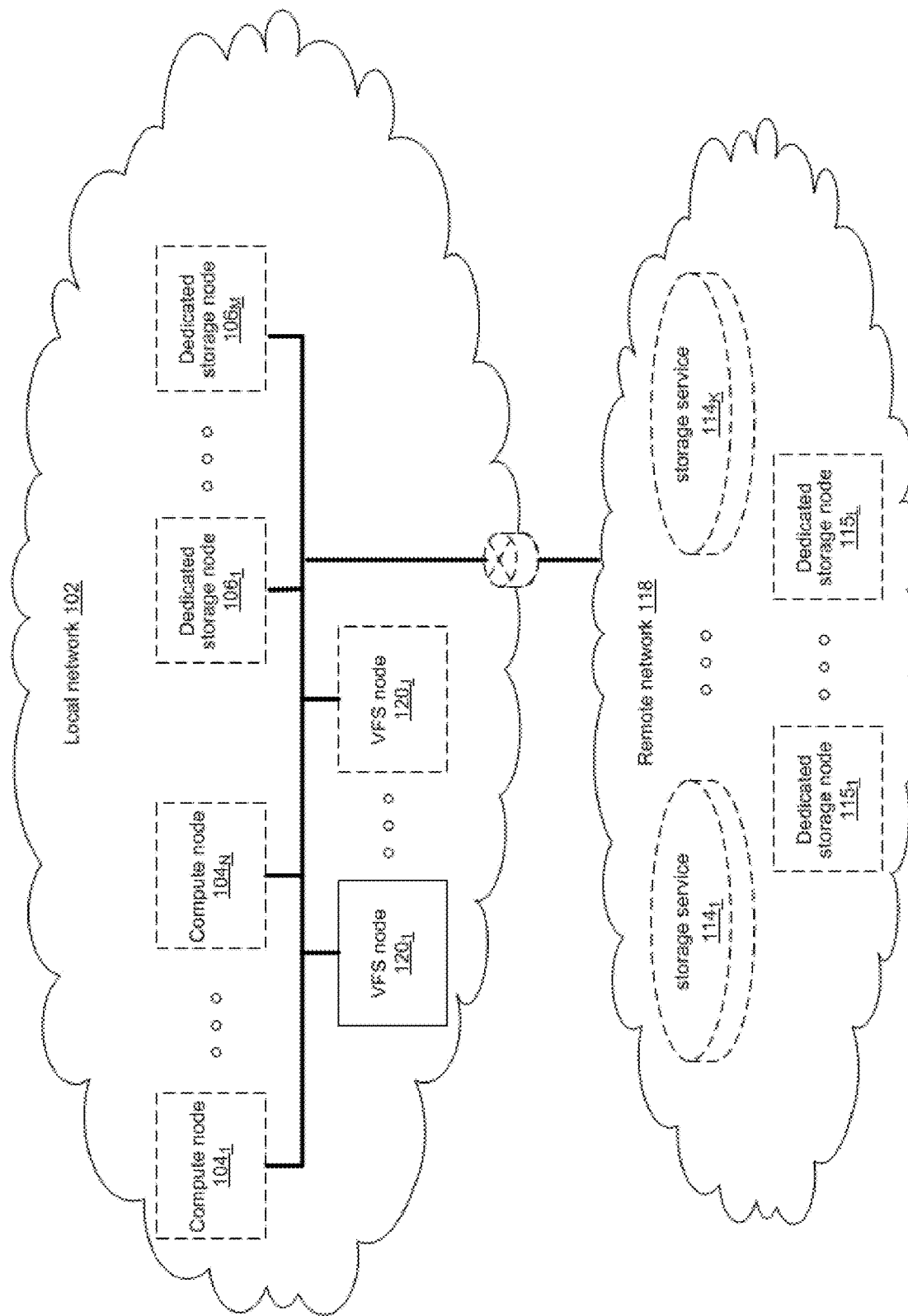
FIG. 1 illustrates various example configurations of a distributed file system in accordance with aspects of this disclosure.

FIG. 1 illustrates various example configurations of a distributed file system in accordance with aspects of this disclosure. Shown in FIG. 1 is a local area network (LAN) 102 comprising one or more nodes 120 (indexed by integers from 1 to J, for j≥1), and optionally comprising (indicated by dashed lines): one or more dedicated storage nodes 106 (indexed by integers from 1 to M, for M≥1), one or more compute nodes 104 (indexed by integers from 1 to N, for N≥1), and/or an edge router that connects the LAN 102 to a remote network 118. The remote network 118 optionally comprises one or more storage services 114 (indexed by integers from 1 to K, for K≥1), and/or one or more dedicated storage nodes 115 (indexed by integers from 1 to L, for L≥1).

Each node $120_j$ (j an integer, where 1≤j≤J) is a networked computing device (e.g., a server, personal computer, or the like) that comprises circuitry for running processes (e.g., client processes) either directly on an operating system of the device $104_n$ and/or in one or more virtual machines running in the device $104_n$.

The compute nodes 104 are networked devices that may run a virtual frontend without a virtual backend. A compute node 104 may run a virtual frontend by taking a single root input/output virtualization (SR-IOV) into the network interface card (NIC) and consuming a complete processor core. Alternatively, the compute node 104 may run the virtual frontend by routing the networking through a Linux kernel networking stack and using kernel process scheduling, thus not having the requirement of a full core. This is useful if a user does not want to allocate a complete core for the file system or if the networking hardware is incompatible with the file system requirements.

Figure 2:
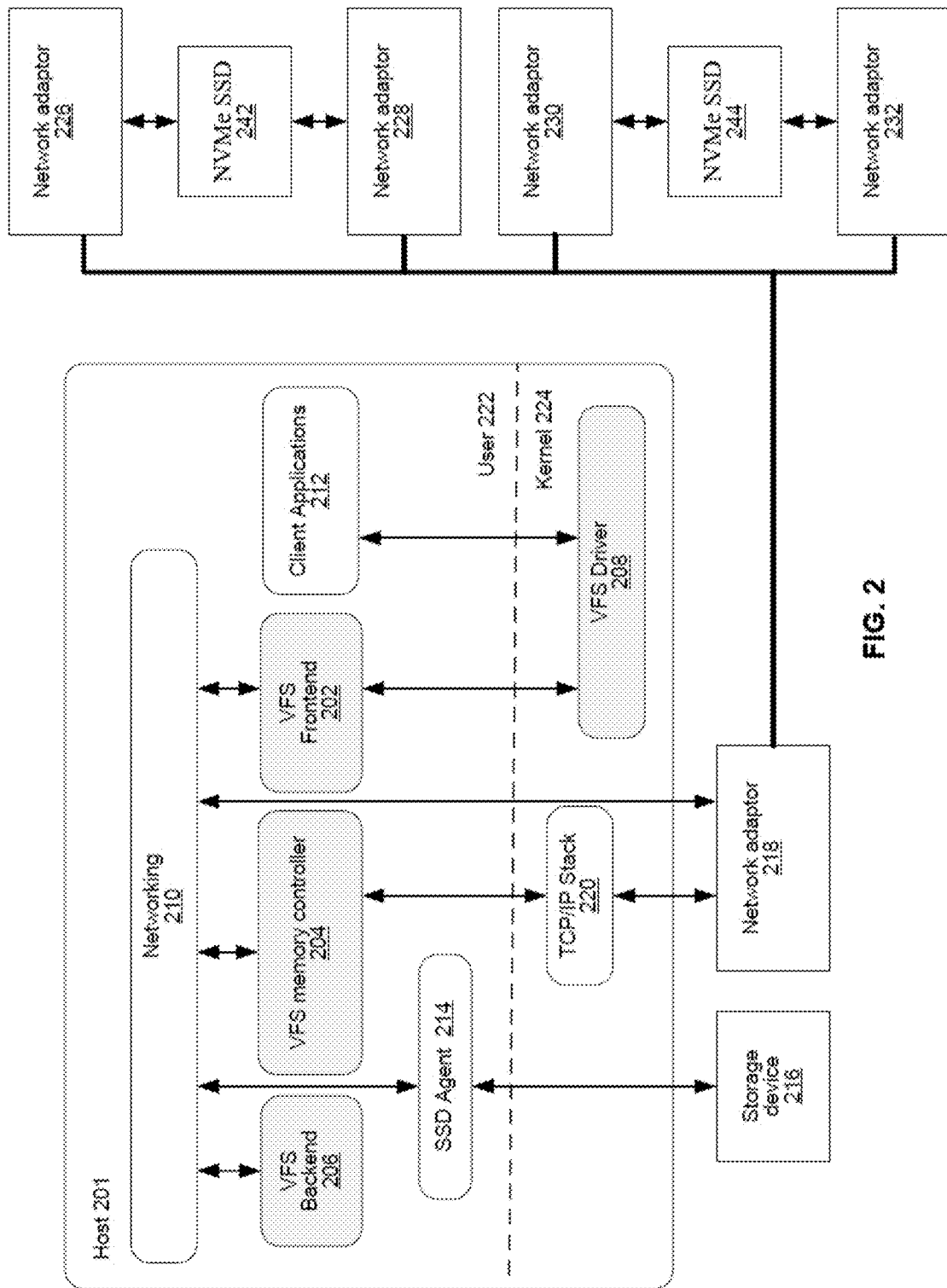
FIG. 2 illustrates an example configuration of a distributed file system node in accordance with aspects of this disclosure.

FIG. 2 illustrates an example configuration of a node in accordance with aspects of this disclosure. A node comprises a frontend 202 and driver 208, a memory controller 204, a backend 206, and an SSD agent 214. The frontend 202 may be a virtual frontend; the memory controller 204 may be a virtual memory controller; the backend 206 may be a virtual backend; and the driver 208 may be a virtual drivers. As used in this disclosure, a virtual file system (VFS) process is a process that implements one or more of: the frontend 202, the memory controller 204, the backend 206, and the SSD agent 214. Thus, in an example implementation, resources (e.g., processing and memory resources) of the node may be shared among client processes and VFS processes. The processes of the VFS may be configured to demand relatively small amounts of the resources to minimize the impact on the performance of the client applications. The frontend 202, the memory controller 204, and/or the backend 206 and/or the SSD agent 214 may run on a processor of the host 201 or on a processor of the network adaptor 218. For a multi-core processor, different VFS process may run on different cores, and may run a different subset of the services. From the perspective of the client process(es) 212, the interface with the virtual file system is independent of the particular physical machine(s) on which the VFS process(es) are running. Client processes only require driver 208 and frontend 202 to be present in order to serve them.

The node may be implemented as a single tenant server (e.g., bare-metal) running directly on an operating system or as a virtual machine (VM) and/or container (e.g., a Linux container (LXC)) within a bare-metal server. The VFS may run within an LXC container as a VM environment. Thus, inside the VM, the only thing that may run is the LXC container comprising the VFS. In a classic bare-metal environment, there are user-space applications and the VFS runs in an LXC container. If the server is running other containerized applications, the VFS may run inside an LXC container that is outside the management scope of the container deployment environment (e.g. Docker).

The node may be serviced by an operating system and/or a virtual machine monitor (VMM) (e.g., a hypervisor). The VMM may be used to create and run the node on a host 201. Multiple cores may reside inside the single LXC container running the VFS, and the VFS may run on a single host 201 using a single Linux kernel. Therefore, a single host 201 may comprise multiple frontends 202, multiple memory controllers 204, multiple backends 206, and/or one or more drivers 208. A driver 208 may run in kernel space outside the scope of the LXC container.

A SR-IOV PCIe virtual function may be used to run the networking stack 210 in user space 222. SR-IOV allows the isolation of PCI Express, such that a single physical PCI Express can be shared on a virtual environment and different virtual functions may be offered to different virtual components on a single physical server machine. The I/O stack 210 enables the VFS node to bypasses the standard TCP/IP stack 220 and communicate directly with the network adapter 218. A Portable Operating System Interface for uniX (POSIX) VFS functionality may be provided through lockless queues to the VFS driver 208. SR-IOV or full PCIe physical function address may also be used to run non-volatile memory express (NVMe) driver 214 in user space 222, thus bypassing the Linux IO stack completely. NVMe may be used to access non-volatile storage device 216 attached via a PCI Express (PCIe) bus. The non-volatile storage device 220 may be, for example, flash memory that comes in the form of a solid-state drive (SSD) or Storage Class Memory (SCM) that may come in the form of an SSD or a memory module (DIMM). Other example may include storage class memory technologies such as 3D-XPoint.

The SSD may be implemented as a networked device by coupling the physical SSD 216 with the SSD agent 214 and networking 210. Alternatively, the SSD may be implemented as a network-attached NVMe SSD 242 or 244 by using a network protocol such as NVMe-oF (NVMe over Fabrics). NVMe-oF may allow access to the NVMe device using redundant network links, thereby providing a higher level or resiliency. Network adapters 226, 228, 230 and 232 may comprise hardware acceleration for connection to the NVMe SSD 242 and 244 to transform them into networked NVMe-oF devices without the use of a server. The NVMe SSDs 242 and 244 may each comprise two physical ports, and all the data may be accessed through either of these ports.

Each client process/application 212 may run directly on an operating system or may run in a virtual machine and/or container serviced by the operating system and/or hypervisor. A client process 212 may read data from storage and/or write data to storage in the course of performing its primary function. The primary function of a client process 212, however, is not storage-related (i.e., the process is only concerned that its data is reliably stored and is retrievable when needed, and not concerned with where, when, or how the data is stored). Example applications which give rise to such processes include: email servers, web servers, office productivity applications, customer relationship management (CRM), animated video rendering, genomics calculation, chip design, software builds, and enterprise resource planning (ERP).

A client application 212 may make a system call to the kernel 224 which communicates with the VFS driver 208. The VFS driver 208 puts a corresponding request on a queue of the VFS frontend 202. If several VFS frontends exist, the driver may load balance accesses to the different frontends, making sure a single file/directory is always accessed via the same frontend. This may be done by sharding the frontend based on the ID of the file or directory. The VFS frontend 202 provides an interface for routing file system requests to an appropriate VFS backend based on the bucket that is responsible for that operation. The appropriate VFS backend may be on the same host or it may be on another host.

A VFS backend 206 hosts several buckets, each one of them services the file system requests that it receives and carries out tasks to otherwise manage the virtual file system (e.g., load balancing, journaling, maintaining metadata, caching, moving of data between tiers, removing stale data, correcting corrupted data, etc.)

A VFS SSD agent 214 handles interactions with a respective storage device 216. This may include, for example, translating addresses, and generating the commands that are issued to the storage device (e.g., on a SATA, SAS, PCIe, or other suitable bus). Thus, the VFS SSD agent 214 operates as an intermediary between a storage device 216 and the VFS backend 206 of the virtual file system. The SSD agent 214 could also communicate with a standard network storage device supporting a standard protocol such as NVMe-oF (NVMe over Fabrics).

Figure 3:
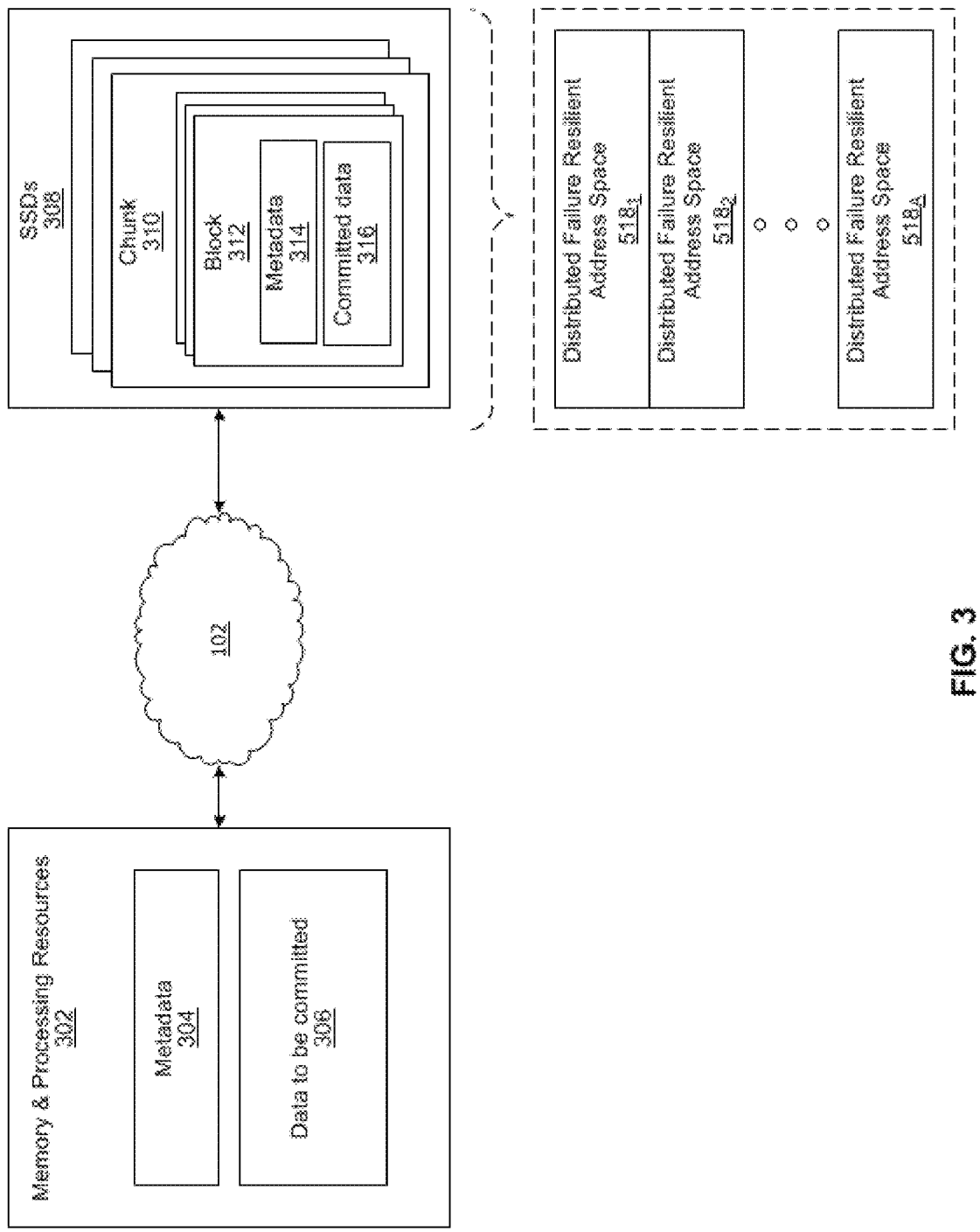
FIG. 3 illustrates another representation of a distributed file system in accordance with an example implementation of this disclosure.

FIG. 3 illustrates another representation of a distributed file system in accordance with an example implementation of this disclosure. In FIG. 3, the element 302 represents memory resources (e.g., DRAM and/or other short-term memory) and processing (e.g., x86 processor(s), ARM processor(s), NICs, ASICs, FPGAs, and/or the like) resources of various node(s) (compute, storage, and/or VFS) on which resides a virtual file system, such as described regarding FIG. 2 above. The element 308 represents the one or more physical storage devices 216 which provide the long term storage of the virtual file system.

As shown in FIG. 3, the physical storage is organized into a plurality of distributed failure resilient address spaces (DFRASs) 318. Each of which comprises a plurality of chunks 310, which in turn comprises a plurality of blocks 312. The organization of blocks 312 into chunks 310 is only a convenience in some implementations and may not be done in all implementations. Each block 312 stores committed data 316 (which may take on various states, discussed below) and/or metadata 314 that describes or references committed data 316.

The organization of the storage 308 into a plurality of DFRASs enables high performance parallel commits from many—perhaps all—of the nodes of the virtual file system (e.g., all nodes $104_1$-$104_N$, $106_1$-$106_M$, and $120_1$-$120_J$ of FIG. 1 may perform concurrent commits in parallel). In an example implementation, each of the nodes of the virtual file system may own a respective one or more of the plurality of DFRAS and have exclusive read/commit access to the DFRASs that it owns.

Each bucket owns a DFRAS, and thus does not need to coordinate with any other node when writing to it. Each bucket may build stripes across many different chunks on many different SSDs, thus each bucket with its DFRAS can choose what "chunk stripe" to write to currently based on many parameters, and there is no coordination required in order to do so once the chunks are allocated to that bucket. All buckets can effectively write to all SSDs without any need to coordinate.

Each DFRAS being owned and accessible by only its owner bucket that runs on a specific node allows each of the nodes of the VFS to control a portion of the storage 308 without having to coordinate with any other nodes (except during [re]assignment of the buckets holding the DFRASs during initialization or after a node failure, for example, which may be performed asynchronously to actual reads/commits to storage 308). Thus, in such an implementation, each node may read/commit to its buckets' DFRASs independently of what the other nodes are doing, with no requirement to reach any consensus when reading and committing to storage 308. Furthermore, in the event of a failure of a particular node, the fact the particular node owns a plurality of buckets permits more intelligent and efficient redistribution of its workload to other nodes (rather than the whole workload having to be assigned to a single node, which may create a "hot spot"). In this regard, in some implementations the number of buckets may be large relative to the number of nodes in the system such that any one bucket may be a relatively small load to place on another node. This permits fine grained redistribution of the load of a failed node according to the capabilities and capacity of the other nodes (e.g., nodes with more capabilities and capacity may be given a higher percentage of the failed nodes buckets).

To permit such operation, metadata may be maintained that maps each bucket to its current owning node such that reads and commits to storage 308 can be redirected to the appropriate node.

Load distribution is possible because the entire file system metadata space (e.g., directory, file attributes, content range in the file, etc.) can be broken (e.g., chopped or sharded) into small, uniform pieces (e.g., "shards"). For example, a large system with 30 k servers could chop the metadata space into 128 k or 256 k shards.

Each such metadata shard may be maintained in a "bucket." Each VFS node may have responsibility over several buckets. When a bucket is serving metadata shards on a given backend, the bucket is considered "active" or the "leader" of that bucket. Typically, there are many more buckets than VFS nodes. For example, a small system with 6 nodes could have 120 buckets, and a larger system with 1,000 nodes could have 8 k buckets.

Each bucket may be active on a small set of nodes, typically 5 nodes that that form a penta-group for that bucket. The cluster configuration keeps all participating nodes up-to-date regarding the penta-group assignment for each bucket.

Each penta-group monitors itself. For example, if the cluster has 10 k servers, and each server has 6 buckets, each server will only need to talk with 30 different servers to maintain the status of its buckets (6 buckets will have 6 penta-groups, so 6*5=30). This is a much smaller number than if a centralized entity had to monitor all nodes and keep a cluster-wide state. The use of penta-groups allows performance to scale with bigger clusters, as nodes do not perform more work when the cluster size increases. This could pose a disadvantage that in a "dumb" mode a small cluster could actually generate more communication than there are physical nodes, but this disadvantage is overcome by sending just a single heartbeat between two servers with all the buckets they share (as the cluster grows this will change to just one bucket, but if you have a small 5 server cluster then it will just include all the buckets in all messages and each server will just talk with the other 4). The penta-groups may decide (i.e., reach consensus) using an algorithm that resembles the Raft consensus algorithm.

Each bucket may have a group of compute nodes that can run it. For example, five VFS nodes can run one bucket. However, only one of the nodes in the group is the controller/leader at any given moment. Further, no two buckets share the same group, for large enough clusters. If there are only 5 or 6 nodes in the cluster, most buckets may share backends. In a reasonably large cluster there many distinct node groups. For example, with 26 nodes, there are more than 64,000 (26!/5!*(26−5)!) possible five-node groups (i.e., penta-groups).

All nodes in a group know and agree (i.e., reach consensus) on which node is the actual active controller (i.e., leader) of that bucket. A node accessing the bucket may remember ("cache") the last node that was the leader for that bucket out of the (e.g., five) members of a group. If it accesses the bucket leader, the bucket leader performs the requested operation. If it accesses a node that is not the current leader, that node indicates the leader to "redirect" the access. If there is a timeout accessing the cached leader node, the contacting node may try a different node of the same penta-group. All the nodes in the cluster share common "configuration" of the cluster, which allows the nodes to know which server may run each bucket.

Each bucket may have a load/usage value that indicates how heavily the bucket is being used by applications running on the file system. For example, a server node with 11 lightly used buckets may receive another bucket of metadata to run before a server with 9 heavily used buckets, even though there will be an imbalance in the number of buckets used. Load value may be determined according to average response latencies, number of concurrently run operations, memory consumed or other metrics.

Redistribution may also occur even when a VFS node does not fail. If the system identifies that one node is busier than the others based on the tracked load metrics, the system can move (i.e., "fail over") one of its buckets to another server that is less busy. However, before actually relocating a bucket to a different host, load balancing may be achieved by diverting writes and reads. Since each write may end up on a different group of nodes, decided by the DFRAS, a node with a higher load may not be selected to be in a stripe to which data is being written. The system may also opt to not serve reads from a highly loaded node. For example, a "degraded mode read" may be performed, wherein a block in the highly loaded node is reconstructed from the other blocks of the same stripe. A degraded mode read is a read that is performed via the rest of the nodes in the same stripe, and the data is reconstructed via the failure protection. A degraded mode read may be performed when the read latency is too high, as the initiator of the read may assume that that node is down. If the load is high enough to create higher read latencies, the cluster may revert to reading that data from the other nodes and reconstructing the needed data using the degraded mode read.

Each bucket manages its own distributed erasure coding instance (i.e., DFRAS 518) and does not need to cooperate with other buckets to perform read or write operations. There are potentially thousands of concurrent, distributed erasure coding instances working concurrently, each for the different bucket. This is an integral part of scaling performance, as it effectively allows any large file system to be divided into independent pieces that do not need to be coordinated, thus providing high performance regardless of the scale.

Each bucket handles all the file systems operations that fall into its shard. For example, the directory structure, file attributes and file data ranges will fall into a particular bucket's jurisdiction.

An operation done from any frontend starts by finding out what bucket owns that operation. Then the backend leader, and the node, for that bucket is determined. This determination may be performed by trying the last-known leader. If the last-known leader is not the current leader, that node may know which node is the current leader. If the last-known leader is not part of the bucket's penta-group anymore, that backend will let the front end know that it should go back to the configuration to find a member of the bucket's penta-group. The distribution of operations allows complex operations to be handled by a plurality of servers, rather than by a single computer in a standard system.

If the cluster of size is small (e.g., 5) and penta-groups are used, there will be buckets that share the same group. As the cluster size grows, buckets are redistributed such that no two groups are identical.

Figure 4A:
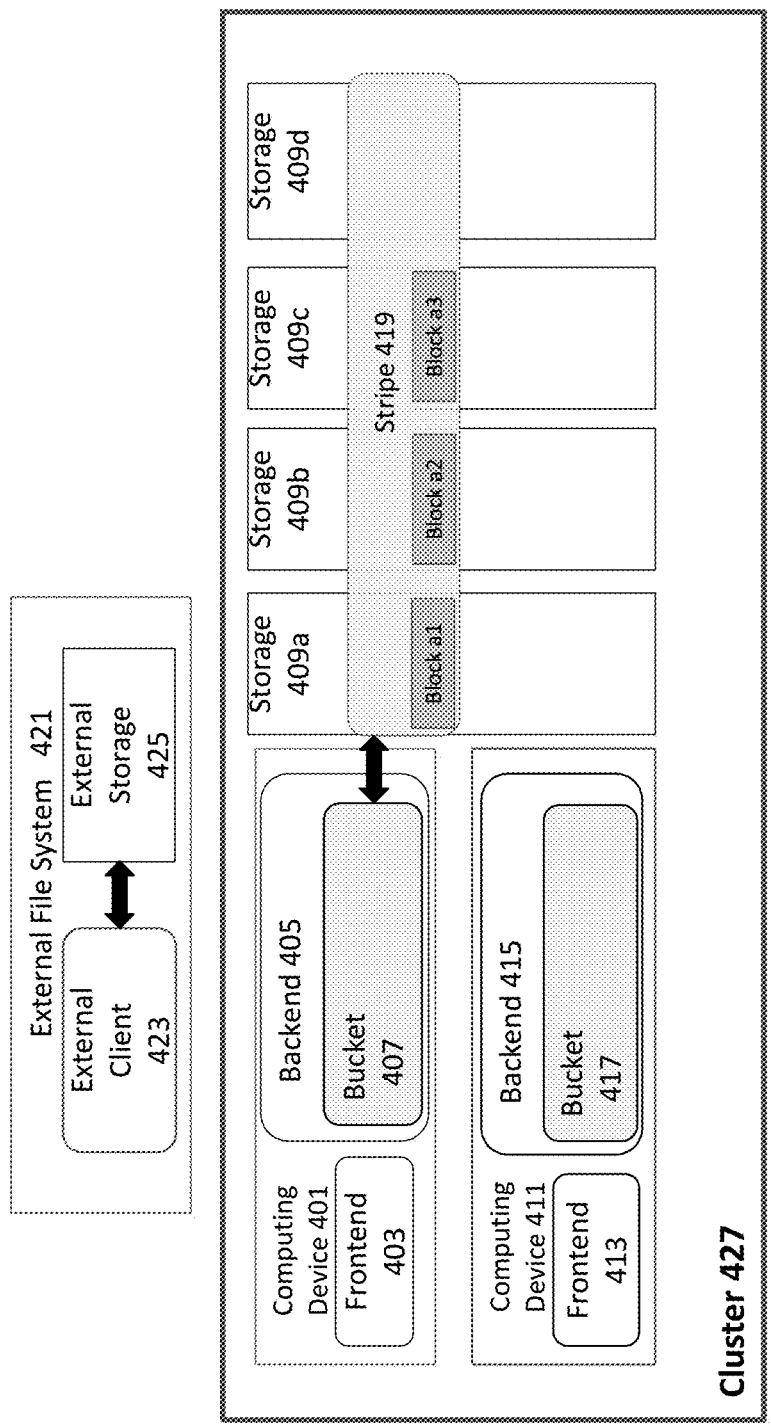
FIG. 4A illustrates an example of an external file system and an internal file system in accordance with an example implementation of this disclosure.

FIG. 4A illustrates an example of a cluster 427 and an external file system 421 in accordance with an example implementation of this disclosure. The cluster 427 comprises an internal file system that may reside on one or more network interface cards (NICs). The external file system 421 comprises an external client 423 and external storage.

For illustration, the cluster 427, as illustrated, comprises two computing devices 403 and 413 and four storage devices 409*a*, 409*b*, 409*c* and 409*d*. A different number of computing devices (e.g., CPU based servers) and storage devices (e.g., SSDs) may be used without deviating from this disclosure. Computing devices 403 and 413 and storage devices 409*a*, 409*b*, 409*c* and 409*d* may be operably coupled via one or more NICs. For example, each computing device 403 and 413 may be on a separate NIC, and the storage devices 409*a*, 409*b*, 409*c* and 409*d* may be on one or more NICs.

Computing device 401 comprises a frontend 403 and a backend 405. The backend 405 comprises at least one bucket 407. Computing device 411 comprises a frontend 413 and a backend 415. The backend 415 comprises at least one bucket 417.

Each bucket in a backend is operable to build one or more failure resilient stripes comprising a plurality of blocks. For example, with 10 blocks, 8 blocks of data could be protected with 2 blocks of error protection/correction (i.e., using an 8+2 stripe). Likewise, with 10 failure domains, 6 blocks of data could be protected with 4 blocks of error protection/correction (i.e., using a 6+4 stripe).

Bucket 407 is operable to build failure-resilient stripe 419, which comprises block a1, block a2 and block a3. In general, each storage block of the plurality of storage blocks in a particular failure-resilient (or failure-protected) stripe may be located in a different storage device of the plurality of storage devices. Alternatively, the plurality of storage blocks of a failure-resilient stripe may be distributed across at least two storage devices of the plurality of storage devices.

Bucket 407 may generate, manage and control failure-resilient stripe 419 via an inode and one or more extents. The inode is a data structure on that stores all the information about a file or directory except its name and its actual data. Each 4 k block in a file may be handled by an object called an extent. The extent ID may be based on the inode ID and an offset (e.g., 1 MB) within the file. And, the extent ID is managed by a bucket. The extents may be stored in the registry of each bucket. The extent ranges may be protected by read-write locks. Each extent may manage the content of a contiguous 1 MB for a file, by managing the pointers of up to 256 4 k blocks that are responsible for that 1 MB data. In other embodiments, larger or smaller memory divisions may also be used. Extents may be stored in volatile memory, e.g., RAM for fast access, backed up by NVM storage as well.

Figure 4B:
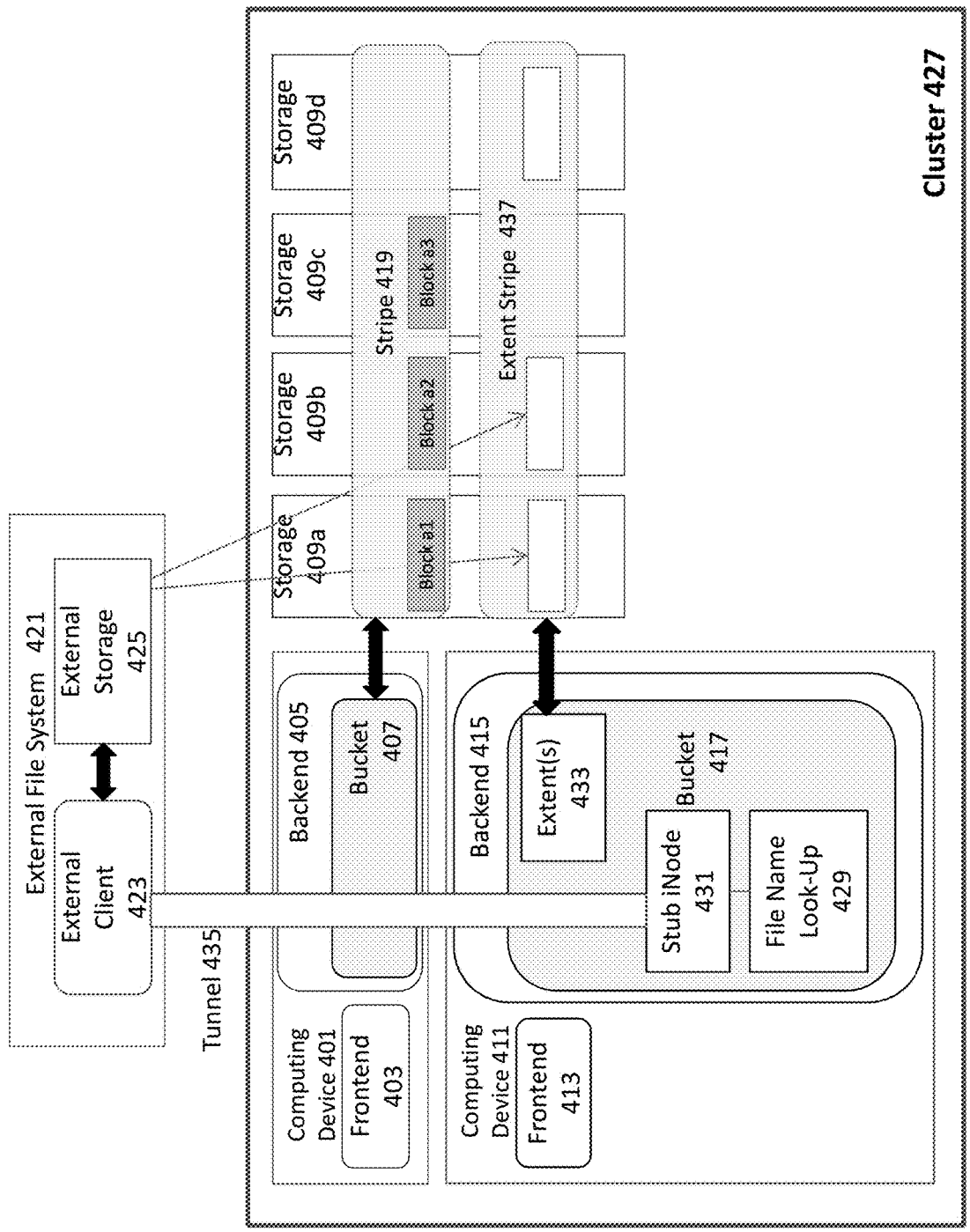
FIG. 4B illustrates an example of data migration from the external file system to the internal file system in accordance with an example implementation of this disclosure.

FIG. 4B illustrates an example of a data migration from the external file system 421 to the internal file system in cluster 427 in accordance with an example implementation of this disclosure. Migrating large file systems could be a very lengthy process, especially if a user tiers multiple file systems. Furthermore, a user may also require access to the external file system before migration can be completed.

The external file system 421 may or may not change during the migration. The migration includes a mapping process to go over the namespace of the external storage 425 and create a directory hierarchy with stub inodes (e.g., stub inodes 431). The stub inode 431 is a substitute for an actual inode, which couples to the storage 409*a-d* via one or more extents 433. The stub inode 431 may quickly allow access to the preexisting external storage 425, while data is migrated, in the background, to the storage 409*a-d*. The mapping process may generate inode stubs for directories as well as files.

The user may be notified when the entire migration process is complete. Upon completion, all stub inodes will be replaced by actual inodes. Alternatively, each stub inode will be replaced by an actual inode as the data is migrated. An opendir function may be run to block an access operation to files on a particular directory until the background process completes the entire directory migration. For directories, opendir may block access until all enclosed file stubs and directory stubs are generated. Thereafter, the opendir will return and readdir may start.

When a file inode stub (or directory inode stub) is opened, the system may pause until that file (or directory) is pulled from the filer. When file inode stubs are open, the migration may create all extents that are possible according to the associated external file. These extents 433 are associated with locations in an extent stripe 437.

A background process may go through the queue of all the stubs and continue creating the namespace 429 and coping the files. The background process may go through all directory inode stubs and then go through all file inode stubs. After all (or each) of the file inodes are created, they may be converted to real inodes and the contents of external files may be downloaded to the extents.

The system may maintain the state of the migration and may be able to notify a user when all files have been copied to the cluster system 427. Each migration process may need to know whether the corresponding namespace 429 still has some stubs (either inodes or extents) or whether all stubs have been converted.

Even if the external file system 421 is large, the data migration is resilient to restarts and failures. The root of the namespace 429 may not be accessed until all files of the root directory are migrated.

Data migration may run concurrently from several nodes. Each backend will be responsible for its own directories and files. If one computing device node 411 is unable to directly mount the migrated external file system 421 and another computing device node 401 is able to directly mount the migrated external file system 421, a tunnel 435 may be generated from the backend 415 of one computing device node 411 to the backend 405 of another computing device node 401.

During migration, progress (e.g., in terms of the number or capacity of files moved) may be indicated. The state of the extents to be fetched and inode stubs to be converted to real directories/files may be maintained. The migration may continue running throughout bucket failover and system restarts.

Figure 4C:
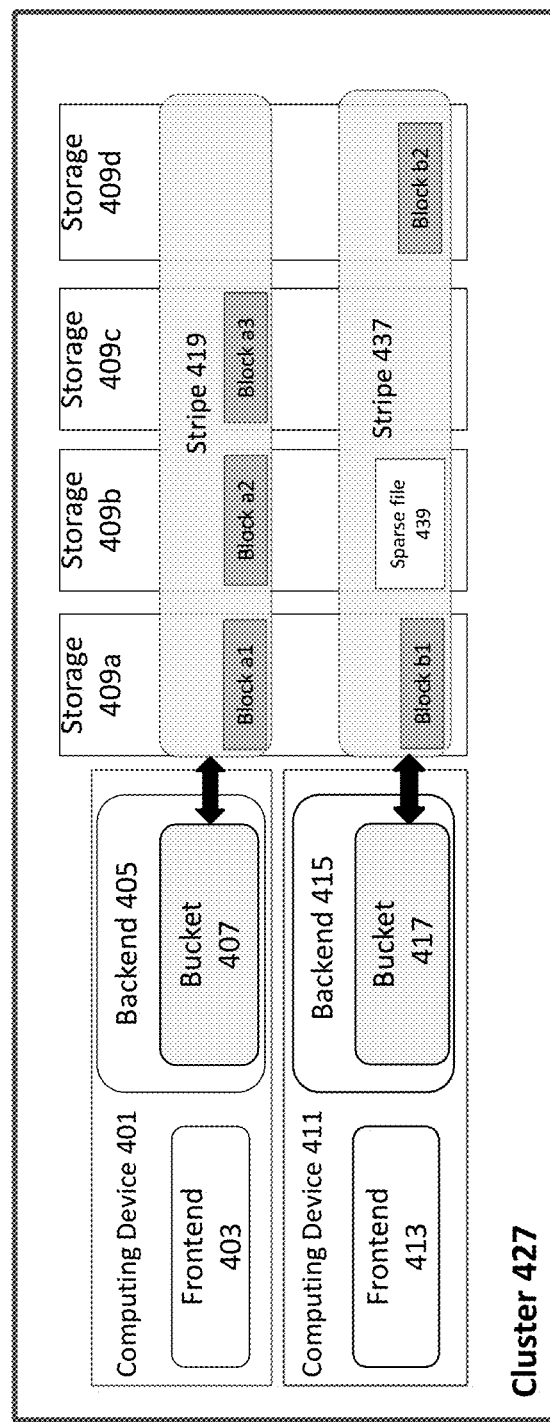
FIG. 4C illustrates an example of the internal file system following data migration in accordance with an example implementation of this disclosure.

FIG. 4C illustrates an example of the internal file system of cluster 427 following data migration in accordance with an example implementation of this disclosure. In the example of FIG. 4C, stripe 437 has been populated by block b1 and block b2. An external file was migrated to block b1. Block b2 comprises data that may be used to restore block b1. The sparse file indicates that the external file system required less space than was allocated. If upon reading an external file, an extent reads full 0s, the extent will be deleted to create a sparse file. The extent corresponding to the sparse file may be added to a queue via a tag in the registry.

FIG. 5 is a flowchart illustrating an example method for data migration from an external file system to an internal distributed file system in accordance with this disclosure. In block 501, inode stubs are generated for the files and directories of an external file system. For example, a bucket in a computing device backend may generate these stub inode data structures.

In block 503, one or more stripes are allocated. These stripes span a plurality of storage devices in the internal file system, and each stripe comprise a plurality of storage blocks. Each stripe may be generated by a bucket in a computing device backend.

In block 505, the contents of the files and directories of the external file system are migrated into the storage blocks of the stripes. During the migration, data may be accessed from the external storage via a stub inode. While a particular file is migrated, access may be blocked by an open command.

In block 507, one or more blocks of error correction data are generated for each stripe according to the migrated data. This error correction data is stored in the corresponding stripe. During a degraded read, in which data on one or more storage devices is unavailable, the error correction data is used in combination with available data to regenerate the unavailable data. A storage block of the plurality of storage blocks is designated as a sparse file is it is not used for migrated data or associated error correction data.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A system comprising:
a plurality of storage devices; and
a computing device comprising a bucket, wherein:
the bucket is operable to read data from an external storage,
the bucket is operable to write data to a failure-protected stripe,
the failure-protected stripe comprises a plurality of storage blocks distributed across a group of storage devices selected from the plurality of storage devices, and
the plurality of storage blocks is determined before data is accessed from the external storage.

2. The system of claim 1, wherein the storage blocks of the failure-protected stripe are distributed across at least two storage devices of the plurality of storage devices.

3. The system of claim 1, wherein at least one storage block of the plurality of storage blocks of the failure-protected stripe is reserved for error correction data that is associated with the other storage blocks of the plurality of storage blocks of the failure-protected stripe.

4. The system of claim 1, wherein the bucket is operable to generate an Mode and one or more extents that point to the plurality of storage blocks of the failure-protected stripe.

5. The system of claim 1, wherein a data structure is used when data is copied from the external storage to the plurality of storage devices.

6. The system of claim 1, wherein a data structure is used after data has been copied from the external storage to the plurality of storage devices.

7. The system of claim 1, wherein a storage block of the plurality of storage blocks is designated as a sparse file if the storage block is not used for migrated data or associated error correction data.

8. The system of claim 1, wherein the bucket is operable to generate a stub inode.

9. The system of claim 8, wherein the stub inode corresponds to a file in the external storage.

10. The system of claim 8, wherein the stub inode corresponds to a directory in the external storage.

11. The system of claim 1, wherein the system comprises a network interface card (NIC).

12. A method comprising:
   generating, by a bucket, a stub inode;
   designating, by the bucket, a stripe comprising a plurality of storage blocks across a group of storage devices selected from a plurality of storage devices;
   migrating data from an external storage to the stripe, wherein the plurality of storage blocks in the plurality of storage devices are determined before data is migrated from the external storage to the plurality of storage devices;
   accessing data from the external storage during data migration, via the stub inode; and
   accessing data from the stripe after data migration.

13. The method of claim 12, wherein the plurality of storage blocks of the stripe are distributed across at least two storage devices of the plurality of storage devices.

14. The method of claim 12, wherein at least one storage block of the plurality of storage blocks of the stripe is reserved for a block of error correction data that is generated according to the other storage blocks of the plurality of storage blocks of the stripe.

15. The method of claim 12, wherein a data structure, comprising an inode and one or more extents that point to the plurality of storage blocks of the stripe, is used to access data from the stripe after data migration.

16. The method of claim 12, wherein a storage block of the plurality of storage blocks is designated as a sparse file if the storage block is not used for migrated data or associated error correction data.

17. The method of claim 12, wherein the stub inode corresponds to a file in the external storage.

18. The method of claim 12, wherein the stub inode corresponds to a directory in the external storage.

19. The method of claim 12, wherein the bucket is on a network interface card (NIC).

20. The method of claim 12, wherein the stripe is a failure-protected stripe.

\* \* \* \* \*